March 5, 1968  S. J. JOHNSON  3,371,396
CUTTER FOR MILLING GEARS AND THE LIKE
Filed April 7, 1966

INVENTOR
Stuart J. Johnson
By Wolfe, Hubbard, Voit & Osann
ATTORNEY

March 5, 1968     S. J. JOHNSON     3,371,396

CUTTER FOR MILLING GEARS AND THE LIKE

Filed April 7, 1966     10 Sheets-Sheet 3

INVENTOR
Stuart J. Johnson
By Wolfe, Hubbard, Vail & Deann
ATTORNEY

March 5, 1968  S. J. JOHNSON  3,371,396
CUTTER FOR MILLING GEARS AND THE LIKE
Filed April 7, 1966  10 Sheets-Sheet 6

March 5, 1968     S. J. JOHNSON     3,371,396

CUTTER FOR MILLING GEARS AND THE LIKE

Filed April 7, 1966     10 Sheets-Sheet 8

INVENTOR
Stuart J. Johnson
By Wolfe, Hubbard, Voit & Osann
ATTORNEYS

March 5, 1968  S. J. JOHNSON  3,371,396
CUTTER FOR MILLING GEARS AND THE LIKE
Filed April 7, 1966  10 Sheets-Sheet 9

United States Patent Office 3,371,396
Patented Mar. 5, 1968

3,371,396
CUTTER FOR MILLING GEARS AND THE LIKE
Stuart J. Johnson, Rockford, Ill., assignor to Barber-Colman Company, Rockford, Ill., a corporation of Illinois
Filed Apr. 7, 1966, Ser. No. 540,901
8 Claims. (Cl. 29—103)

This invention relates to the milling of gears, ratchets, splines and similar toothed rotary parts in an ordinary hobbing machine in which the work and cutter are rotated in precise synchronism while being fed relative to each other along the work axis. In such machines using an ordinary hob, metal is milled from the work by a so-called generating action in which only part of the multisided cutting edge of the successively acting hob teeth comes into cutting engagement with the work at any time. Thus, instead of having a profile corresponding to the cross-section of the interdental spaces to be formed, the cutting faces of the hob teeth are of the same height and of different shape than such spaces.

In contrast to such generating action and, as disclosed in Patent No. 3,059,546, the teeth of a gear may be milled in a continuous operating cycle performed in a conventional hobbing machine by a cutter having teeth with cutting faces of a determined contour to produce the required contour of the interdental spaces and arranged in a thread inclined at a helix angle corresponding to the pitch of the teeth to be formed and also stepped radially so that the cross-section of the metal layers removed by the successive teeth corresponds to the shape of the interdental spaces. While more rapid and efficient metal removal is achieved in the patented construction than in conventional hobbing, the number of cutter teeth that can be used is limited as is the size of the gear that can be formed due to the necessity of using a swinging form tool for varying the radial heights of the successive teeth.

The general object of the present invention is to overcome the limitations of the patented cutter by providing a cutter adapted for cutting gears of all sizes, particularly larger sizes, by increasing substantially the available number of cutting teeth and therefore the production capacity of the cutter, and by providing for more uniform overall loading of the cutter in spite of the increased rate of metal removal.

Another object is to so shape and position the cutting edges of the cutter teeth relative to the cutter body that a substantially uniform volume of metal is removed by each of the teeth thus achieving optimum production capacity and uniform loading of the cutter.

A more detailed object is to shape the profiles and vary the heights of the successively acting teeth by a rectilinear instead of by a swinging movement of the tool by which the tooth profiles are formed.

A further object is to achieve uniform loading of the cutters by arranging a plurality of teeth in rows extending longitudinally as well as helically around the cutter body, the longitudinal rows being inclined relative to the cutter axis so that there is at least a small overlap between the breaking of the leading tooth of such row out of the work and the entry of the trailing tooth of that row.

The invention also resides in the novel radial stepping of the teeth to provide for progressively decreasing the thickness and increasing the length of the metal layers removed by the successively acting teeth so that substantially equal volumes of metal will be removed by all of the teeth.

Other objects and advantages of the invention will becomes apparent from the following detailed description taken in connection with the accompanying drawings, in which.

While teeth of various shapes may be produced, the invention is embodied for purposes of illustration in a milling cutter 26 designed for use in a conventional hobbing machine (FIG. 3) to mill away successive layers or chips of metal as shown in FIGS. 10 to 18 from a cylindrical work blank 27 and form a helical gear 28 (FIGS. 4 and 5) having interdental spaces 30 between the peripheral teeth 31 of the gear. In the illustration, the gear is about seventeen feet in diameter with 300 teeth with a helix angle of 7° while the cutter is 10⅞ inches long and 10¾ inches in diameter with fifty teeth arranged in two helical rows or threads (see FIG. 6) each extending two full revolutions around the cutter body 29 and having a lead angle of 8°17′. The successively acting teeth of the two helical rows are numbered 1 to 25 and 1′ to 25′ respectively.

Figure 2:
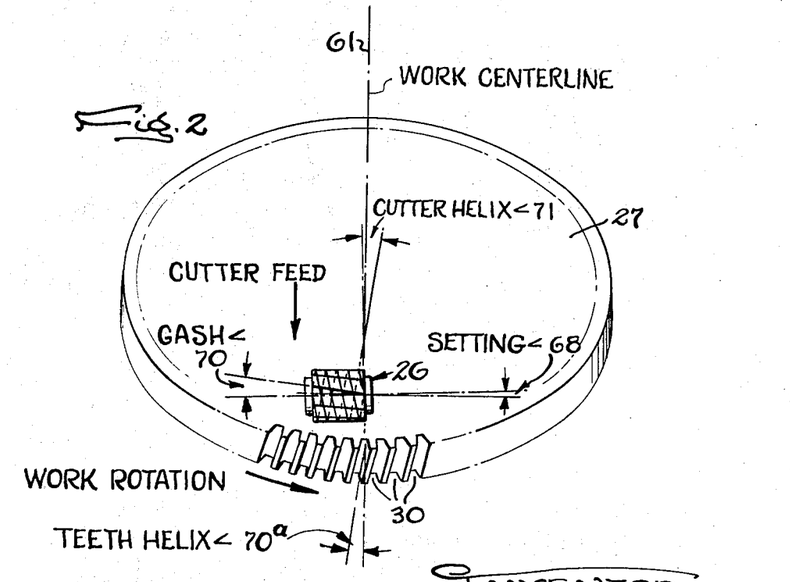
FIG. 2 is a schematic view showing the positional relation of various parts of the cutter and work.
Figure 3:
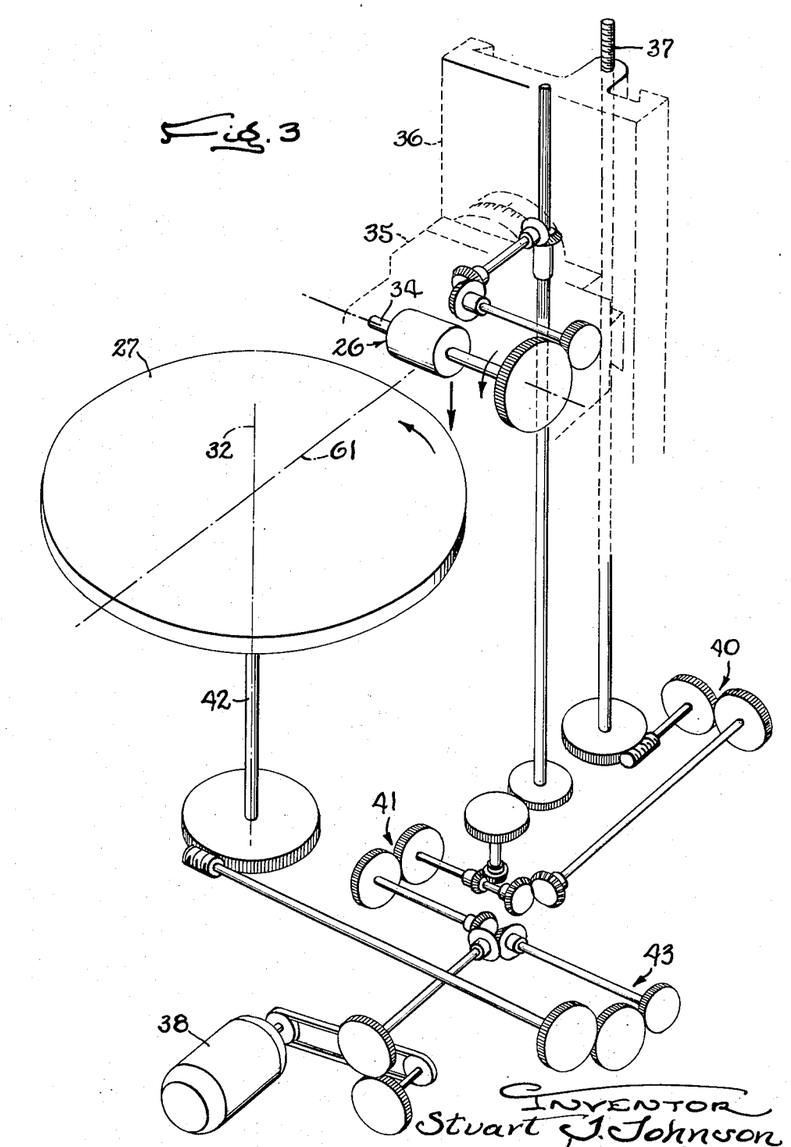
FIG. 3 is a fragmentary perspective view of the essential elements of a gear hobbing machine.
Figure 4:
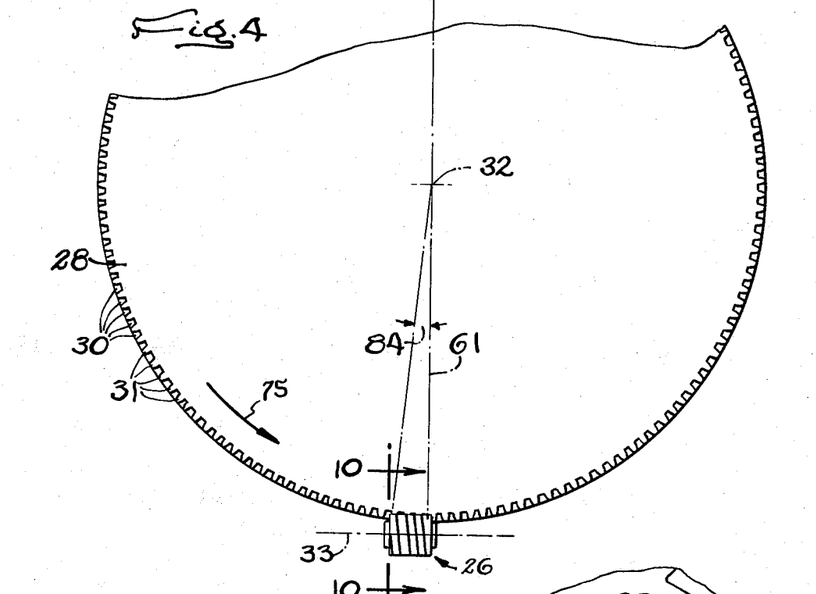
FIG. 4 is a fragmentary plan view of the work and cutter.
Figures 5, 7:
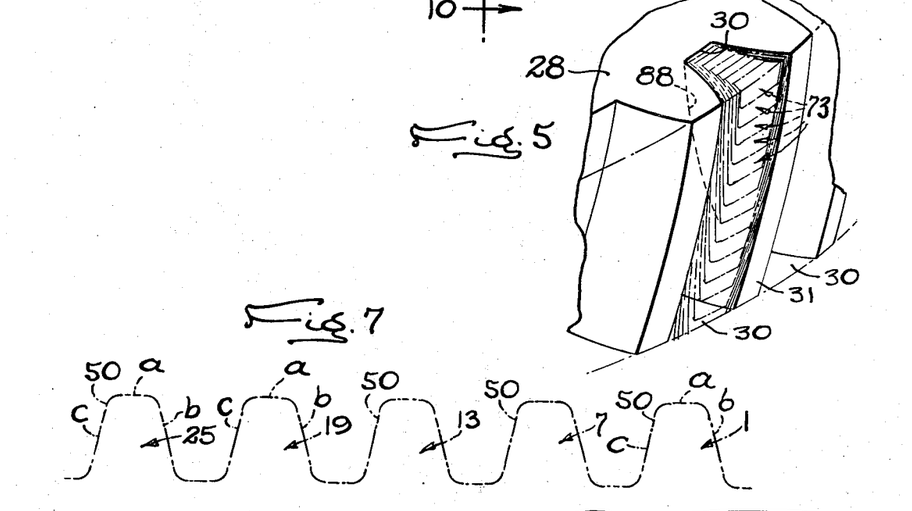
FIG. 5 is a fragmentary perspective view illustrating the manner of chip removal to form an interdental tooth space.
FIG. 7 is a projection of one row of cutter teeth taken along the line 7—7 of FIG. 6.

As in the conventional hobbing of gears, the removal of metal to form all of the interdental spaces 30 of the gear takes place in a continuous operating cycle and involves generally the mounting of a cylindrical work blank 27 and the cutter as shown in FIGS. 3 and 4 to turn in precise synchronism about spaced transversely extending axes 32 and 33 while feeding the cutter transaxially and across the periphery and along the axis of the work in the direction indicated by the arrows in FIGS. 2 and 3. In the machine shown schematically in FIG. 3, the cutter 26 is fast on a spindle 34 journaled on the usual slide 35 supported from a carriage 36 which is slidable vertically along the machine bed. A screw 37 for feeding the cutter along the work axis 32 is driven by a motor 38 through suitable gearing including feed change gears 40. The cutter is driven by the motor through gearing including speed change gears 41. The gear blank 27 is fast on a spindle 42 rotatably mounted on the machine base and driven through a gear train including index change gears 43. With this arrangement, the workpiece and cutter are rotated in proper synchronism with each other while being fed axially to carry the cutter across the periphery of the work.

Figure 9:
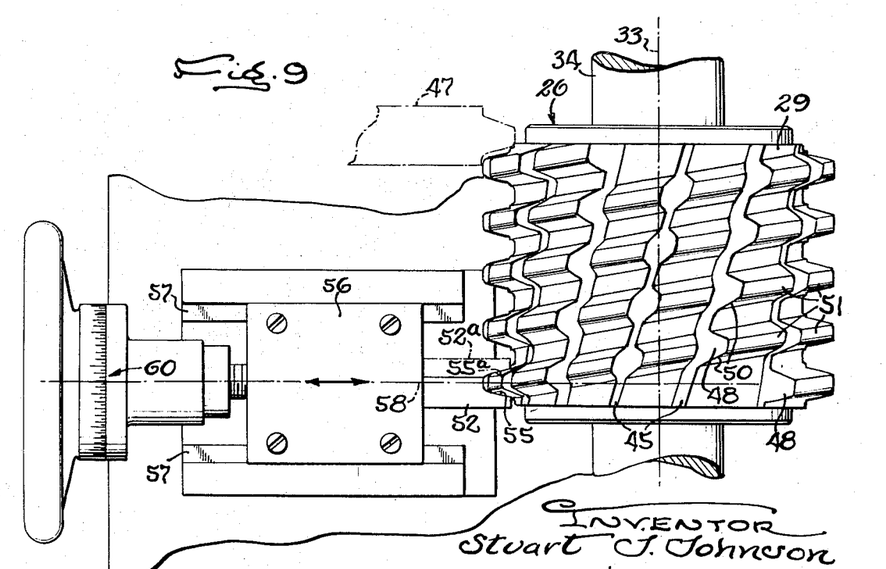
FIG. 9 is a fragmentary plan view of FIG. 8.

In the cutter illustrated, the teeth are integral with the body 29. They are formed and their cutting edges are shaped and positioned for milling each interdental space 30 to a desired cross-sectional profile. First, helical gashes 45 extending longitudinally of the body are milled in the blank, there being twelve such gashes in the present instance uniformly spaced apart around the body according to the desired circumferential lengths of the teeth. Next, helical grooves 46, two in this instance, are cut in the body to form the sides of the teeth of greatest radial length, each groove extending around the body throughout the length thereof and through two full revolutions in this instance. This is accomplished in a conventional screw turning operation using a lathe tool 47 shaped as shown in phantom in FIG. 9 and having a cutting edge preferably shaped to produce the desired cross-sectional shape of the teeth to be formed on the gear.

Each of the cutter teeth thus formed has a cutting face 48 defined by the trailing wall of one of the gashes 45 and disposed at the proper rake angle determined by the work and cutting materials involved. Each cutting face is bounded by a cutting edge 50 and having a profile which is determined by the desired cross-sectional shape of the interdental spaces 30 to be milled in the gear. For milling the teeth of helical or spur gears, each cutting edge comprises a tip $a$ at the outer end of the tooth and edges $b$ and $c$ at the sides.

Figure 8:
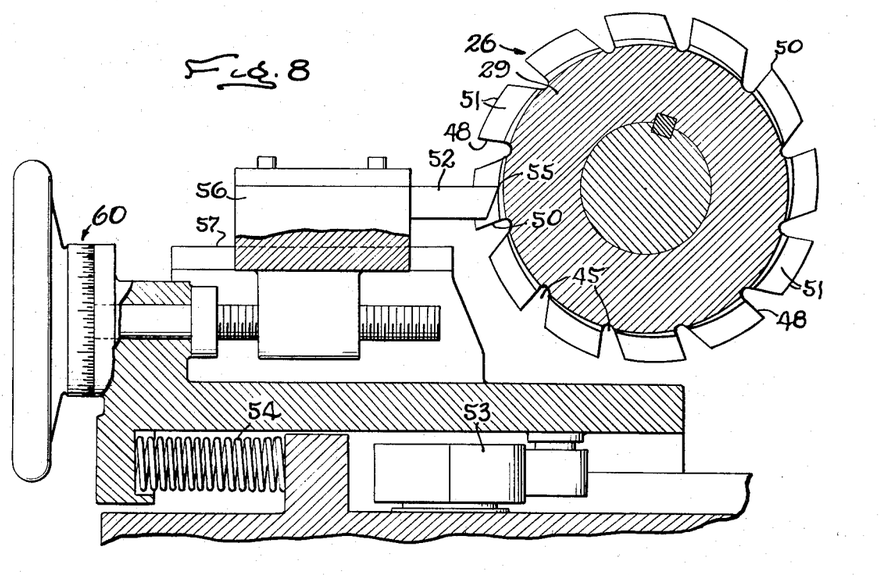
FIG. 8 is a fragmentary section of the elements of a conventional back-off machine.

To provide proper cutting relief and allow the cutter to be resharpened by grinding back the cutting faces 48, the top and sides of each tooth are cut away to form clearance faces 51. This is accomplished in a conventional back-off type of lathe illustrated in FIGS. 8 and 9 in which a tool 52 is alternately fed into the cutter by a cam 53 and retracted by a spring 54 to take successive cuts from each tooth starting at the cutting edge end 50 and progressing to the trailing end. Preferably, two tools 52 and 52ᵃ are used having cutting edges 55 and 55ᵃ which fit the tooth thread spaces on opposite side halves and are shaped to produce the contour required for milling the interdental spaces to the desired cross-section. First, one side of all of the teeth of the cutter are finished with the tool 52 set in the position shown in full in FIG. 9. Then, with the tool 52ᵃ set as shown in phantom, the left sides of all of the teeth are finished.

For a purpose to appear later, it is important that the back-off tool 52 be disposed in the same angular position relative to the cutter axis in forming each of the teeth of the cutter. That is to say, it is fixed to a slide 56, guided along ways 57 so as to be movable only rectilinearly toward and from the cutter along a path 58 indicated by the arrow in FIGS. 8 and 9 extending transversely of the cutter axis. At the same time, the tool may be adjusted radially of the cutter in accurately determined increments measured for example on a scale 60 (FIG. 8) so that the cutting faces of the individual teeth may be formed to different radial heights and the cutting edge 50 and the clearance faces 51 thus stepped inwardly or outwardly relative to each other in accordance with a predetermined pattern later to be described. Such stepping is effected by performing the clearance forming operations selectively and individually at least on the shorter ones of the teeth combined with selective adjustment of the tool 52 according to the desired radial height of the individual teeth.

Since the cutting edge 50 of each of the cutter teeth is machined to the desired final profile with the back-off tool 52 disposed in the same angular position relative to the cutter axis and is moved only rectilinearly relative to the cutter body, it will be apparent that the corresponding parts, for example $b$ or $c$, of all the cutting edges on all of the teeth are disposed in identical angular positions relative to the cutter axis. For the same reason, the surfaces of revolution described by all of these edges during rotation of the cutter will be parallel as is evident from FIG. 7 which is a projection of the cutting edges along one gash of teeth 1, 7, 13, 19 and 25 on an axial plane.

This is an important characteristic of the present cutter in that it enables an optimum number of cutter teeth to be used, arranged in closely spaced helical rows, and to be adapted for milling gears of any diameter. Thus, the present cutter overcomes limitations inherent in the cutter disclosed in the aforesaid patent in which the formation of the successively acting teeth to different radial lengths is achieved by a swinging of the back-off tool in the course of forming the final tooth profiles.

Figure 6:
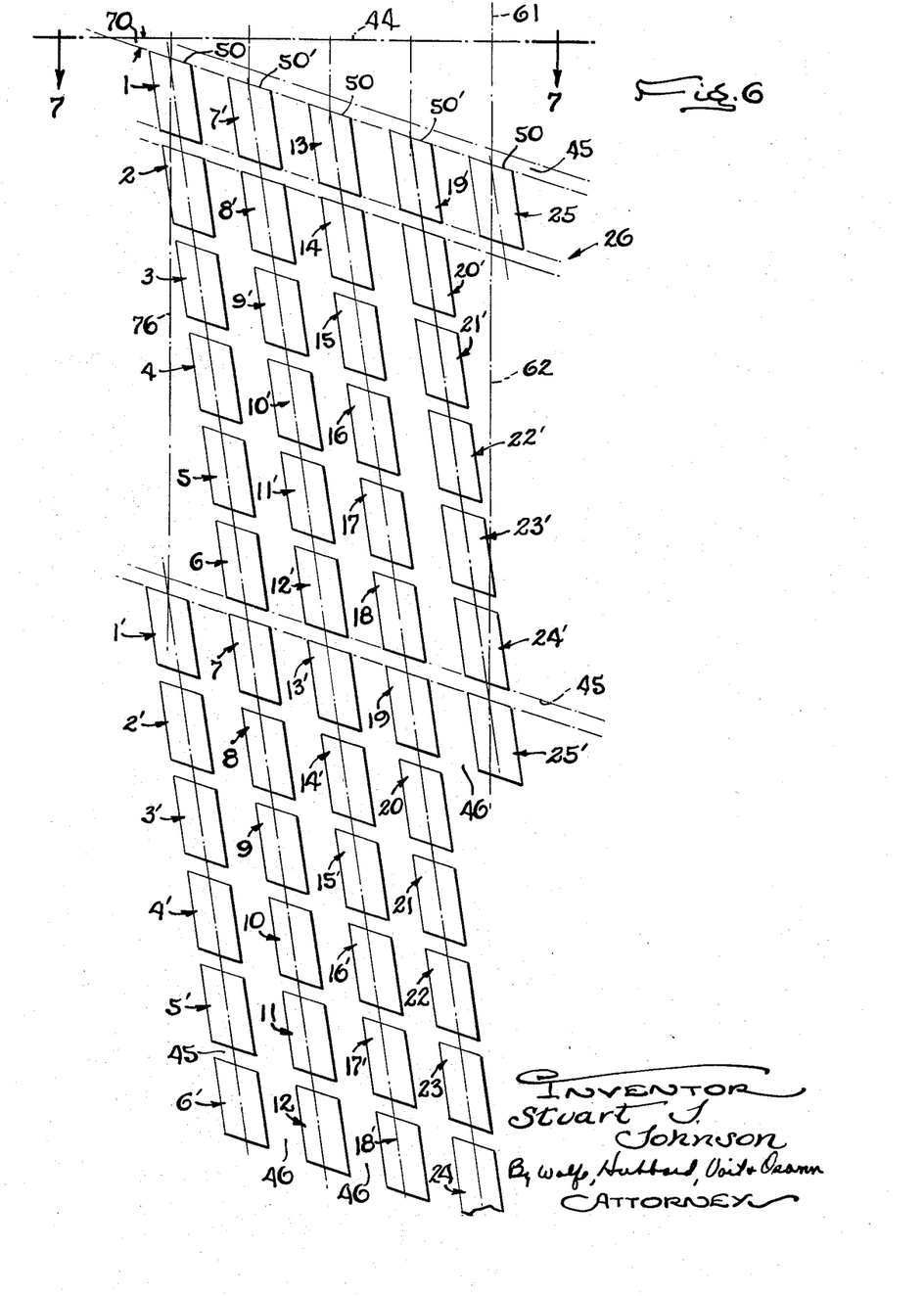
FIG. 6 is a development view of the teeth in the improved cutter.
Figure 19:
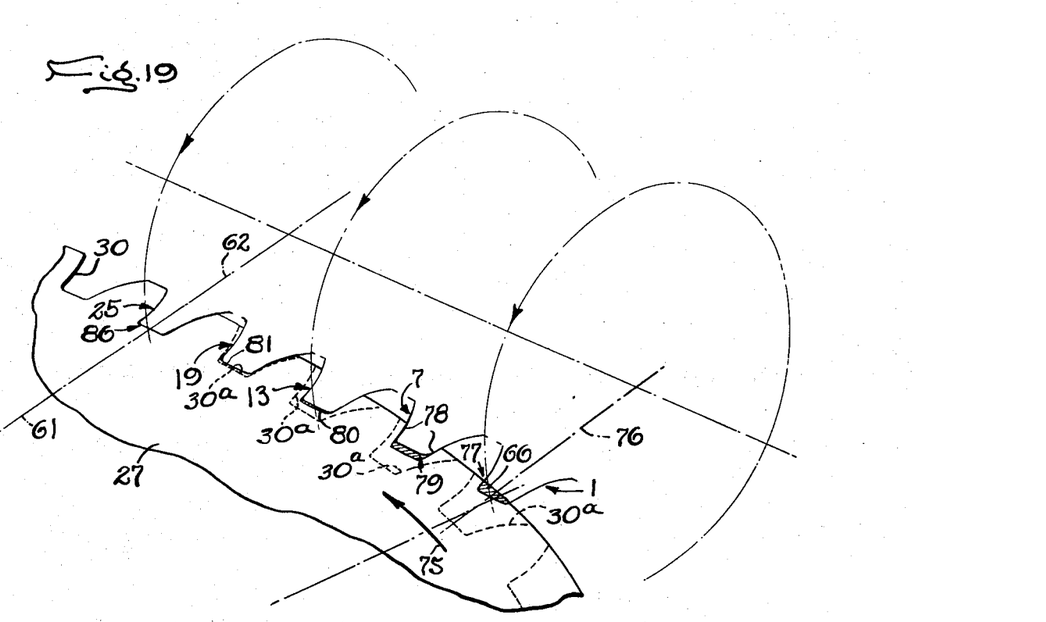
FIG. 19 is a schematic view illustrating the surfaces of revolution of the teeth of one longitudinal row projecting onto the face of the workpiece.

In service use, the cutter above described is mounted in the hobbing type machine for operation of each cutting edge 50 on the work with a so-called all approach action. That is to say, the cutting engagement occurs only while the interdental space of the work is rotating from an initial contact position with cutter tooth 1 (at the right in FIG. 19) to a center plane 61 in which the finishing cutter tooth 25 rotates (See FIG. 4). Such all approach action is achieved by mounting the entire cutter on the approach side of the axial or center plane 61 of the work blank as illustrated in FIGS. 4, 6 and 19 with the plane of rotation of the last acting tooth, 25 or 25' in this instance, disposed on such plane. Thus, with the cutter and work set at an angle determined by the lead of the cutter teeth and the helix angle of the teeth of the gear to be cut and turning in proper synchronism, each finishing tooth 25 or 25' will move into and longitudinally through the successive interdental spaces 30 along a cutting line 62 (FIG. 11) before passing out of cutting engagement at 63.

Figure 20:
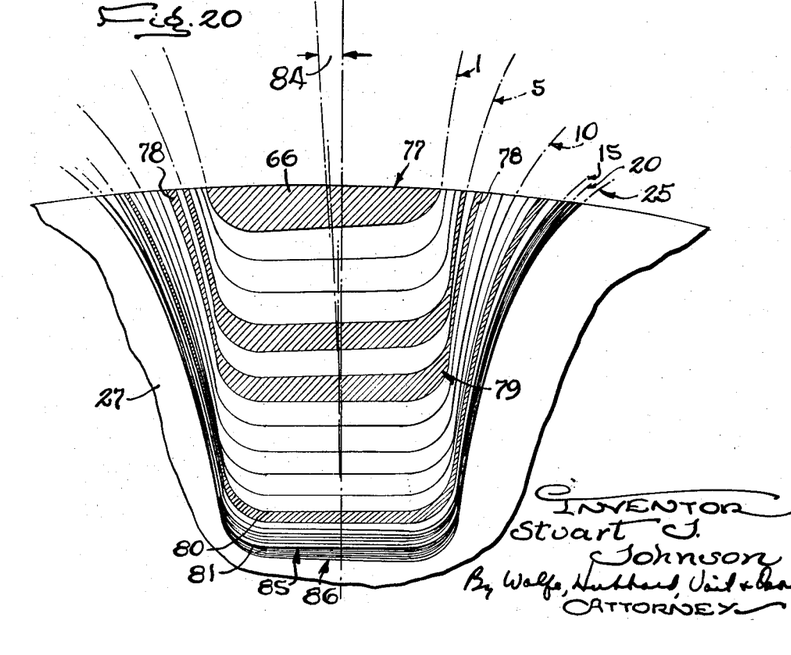
FIG. 20 is a projection taken on the plane 20—20 in FIG. 11 showing the metal layers removed by the successively acting groups of teeth.

Since the last acting tooth determines the finished cross-section of the interdental spaces in traversing its fixed plane 62 of rotation, its profile must produce such cross-section during its engagement with the work. This means that the surface of revolution produced by the cutting edges as viewed on a radial plane 44 (FIGS. 6 and 7) of the cutter must have a determined shape that will produce the desired and final cross-section of the interdental spaces as shown in FIG. 20. Accordingly, the cutting edge of the grooving tool or the form tool 52 or both of these edges are shaped to produce such a profile in the grooving or back-off operations above described.

It will be apparent from the foregoing that with the cutter set for the all approach action above described and during the synchronized rotation of the cutter and work as illustrated in FIGS. 4 and 19, the successive teeth of each helical row will enter progressively deeper into the arcuately moving and partially formed interdental spaces and that these same teeth will engage the work and move transversely through the periphery thereof along arcuate lines which increase progressively in length from the first tooth 1 to the last tooth 25. Thus, the first tooth may take its cut along a line 65 (FIG. 11) and remove a chip 66 of short length (FIG. 13) while the tip of the last acting tooth 25 cuts along a much longer arc 62 and removes a correspondingly long chip 67 (FIG. 18) of U-shaped or channel cross-section thus producing the final cross-sectional profile of the interdental spaces of the work.

Figure 1:
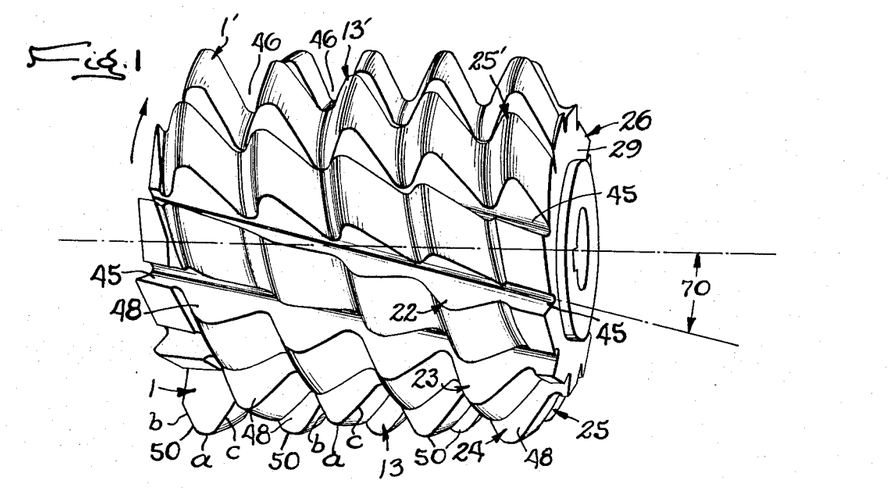
FIG. 1 is a perspective view of a milling cutter incorporating the novel features of the present invention.

This finishing tooth thus controls the entire design of the cutter for producing the desired tooth form on the work in accordance with the present invention. The diameter of the work, the number of teeth, the tooth shape, the setting angle (FIG. 1), the amount of step-down as described later, and the feed of the cutter across the work are factors which are considered in deciding on the size of the cutter, the number of teeth required, the shape of the finishing tooth, etc. In general, the following requirements should be satisfied:

(1) The angle 70 of the gashes 45 of the cutter must be of the same hand, right in this instance, as the thread angle 71 of the cutter, right hand herein.

(2) The difference between the gear helix angle 70ª, 7 degrees herein, minus the cutter thread angle 71, 8°17′ herein, should be less than 8 degrees and preferably as near zero as possible.

(3) The lead angle of the cutter 71, 8°17′ herein, plus the gash angle 70, 17° in this instance, should be approximately 25 degrees.

(4) The number of teeth on the cutter, 25 in each helical row of thread in the present instance, should equal the number of teeth, 300 herein, on the work divided by about 6 times the number of cutter threads.

(5) As in conventional hobbing practice, the axis of the cutter is disposed at an angle 68 (FIG. 1) relative to the horizontal or the face of the gear. The magnitude of this so-called setting angle compensates for the difference between the lead of the cutter teeth and the helix angle of the gear to be milled.

Compliance with the foregoing including the proper positioning and shaping of the last acting cutter tooth in each helical row adapts the cutter for proper completion of each interdental space 30 of the gear when the cutter is used with the all approach action above described in a conventional hobbing machine.

Figure 11:
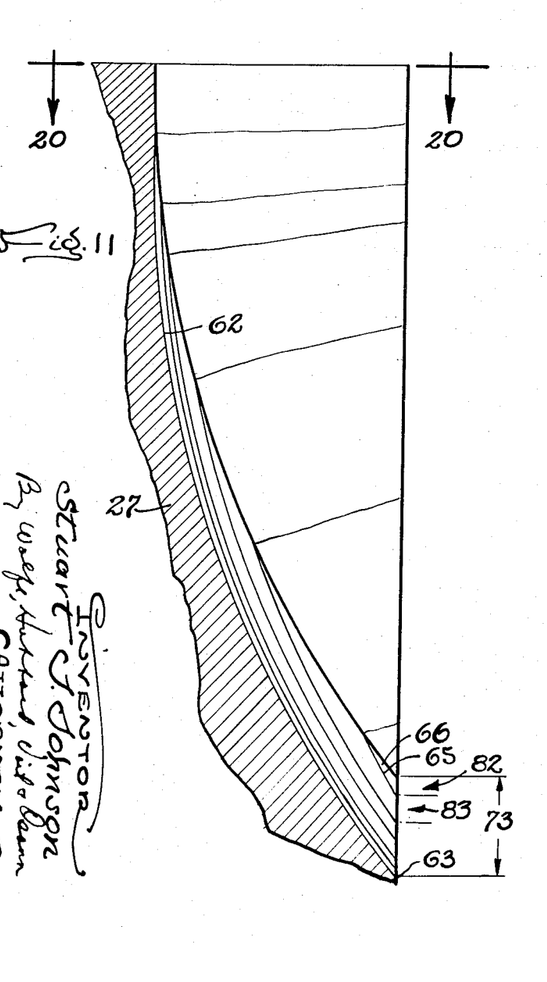
FIG. 11 is a fragmentary longitudinal section taken through a partially completed interdental space illustrating the layers of metal removed by the different groups of teeth.
Figure 12:
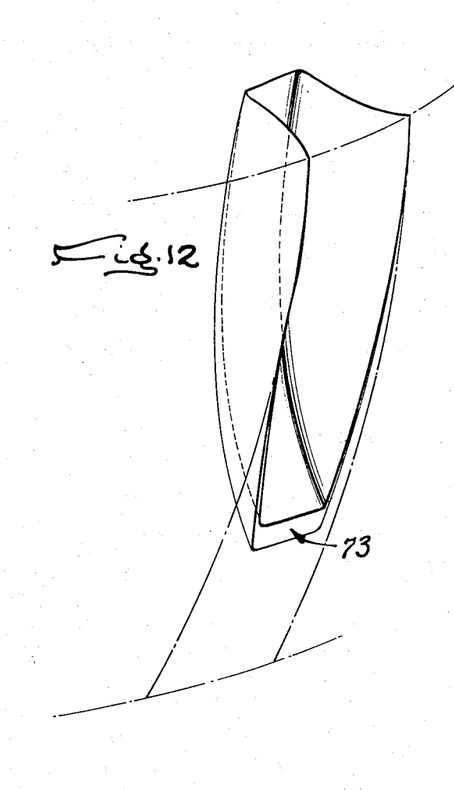
FIG. 12 is a perspective view showing the layer of metal removed by all of the successively acting teeth in one helical row on the cutter.
Figure 13:
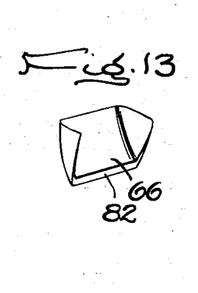
FIGS. 13–18 are perspective views of the metal layers shown in FIG. 11.
Figure 14:
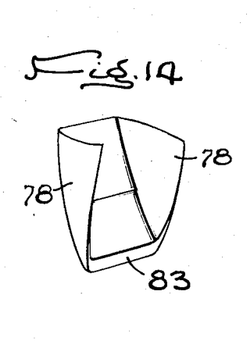
Figure 15:
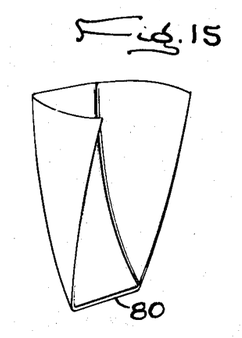
Figure 16:
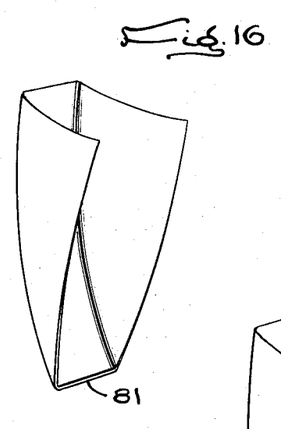
Figure 17:
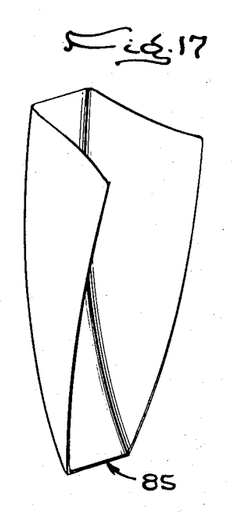
Figure 18:
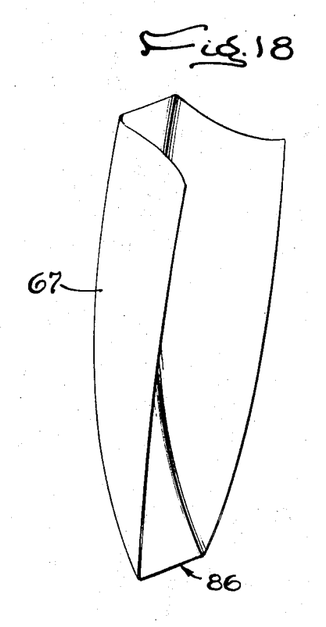
Figures 21, 22:
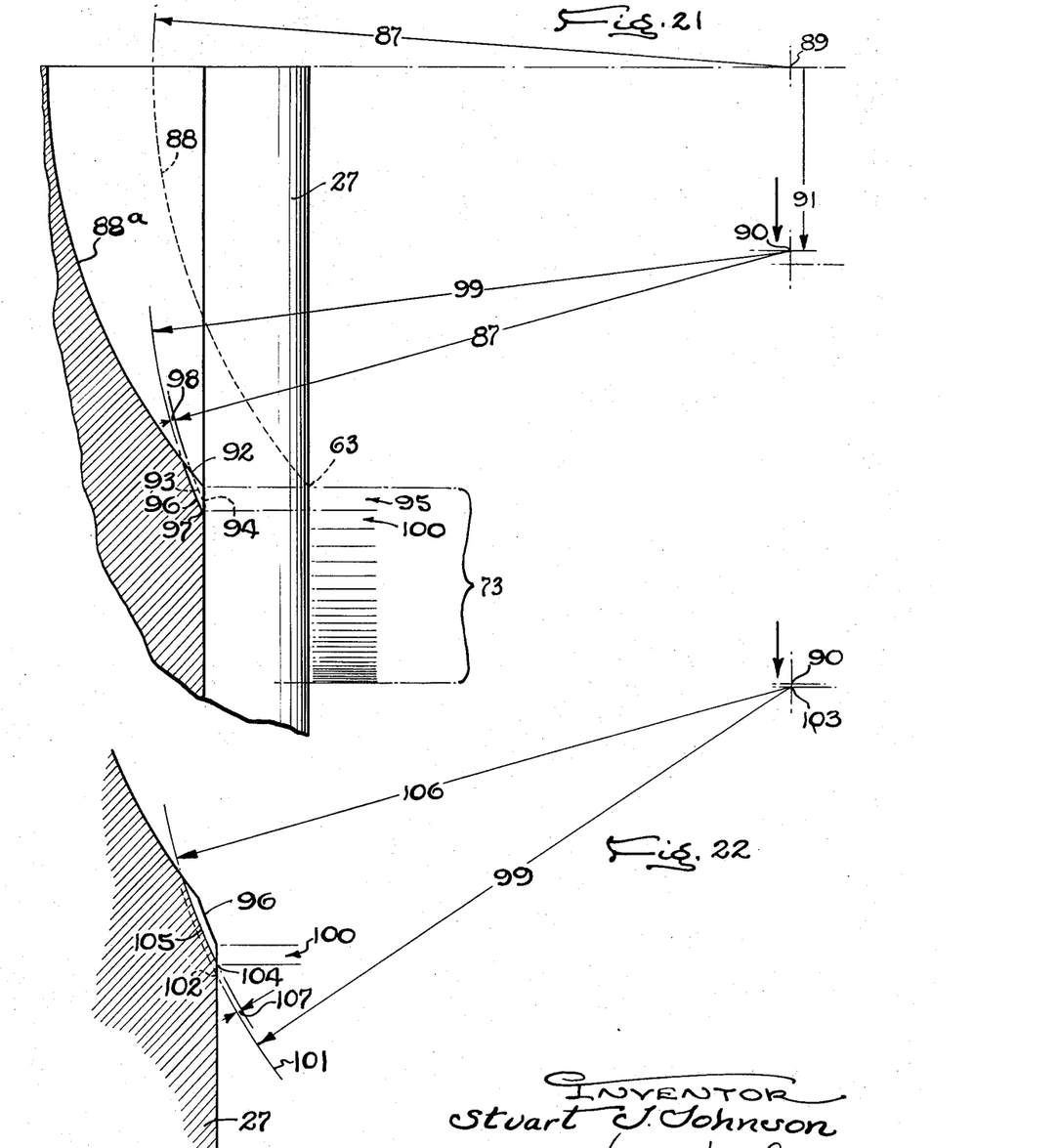
FIGS. 21 and 22 are schematic layouts used in determining the step-down of the successively acting cutter teeth.

The present invention contemplates shaping, not only the finishing teeth 25 to 25′ to produce the desired final gear tooth profiles but also shaping the preceding teeth of each helical row with a corresponding profile and selectively stepping the cutting edges 50 radially inwardly or outwardly in accordance with a definite preselected pattern which provides for milling of the spaces 30 at an optimum rate and also for more uniform loading of all of the cutter teeth in service use. More particularly, the stepping pattern is such that the successively acting teeth remove layers of metal (FIGS. 11 to 20) which are of progressively decreasing thickness but of increasing length with the result that each tooth including the finishing tooth, removes substantially the same volume of metal from the workpiece. To accomplish this, the radial position of each cutting edge 50 in relation to the radial heights of the cutting edges of the adjacent teeth is determined manually after assigning to that tooth a definite thickness of metal to be removed in relation to the length of the layer as determined by the arc of the transverse area of its engagement with the work. Knowing the maximum chip thickness permissible with the work and cutting material involved, the designer of the improved cutter divides up the total depth of the metal to be removed into a number of increments 73 such as illustrated in FIGS. 11, 12 and 21 equal to the number of cutter teeth in each helical row and assigns the successive increments to the successively acting teeth. In order to achieve high production by the cutter, the chip thickness assigned to any one tooth is preferably near the maximum permitted. Thus, initially acting or roughing tooth 1 may be stepped down in relation to the previously acting tooth 25 so as to take a chip of substantial thickness 82 (FIGS. 11 and 13) where the tooth leaves the blank. For the next group of teeth, for example, 2 to 4, a layer 83 (FIG. 14) may be assigned in view of the longer arc of engagement and the increased depth of the wings.

In a similar way, the thicknesses assigned to the teeth 6–10, 11–15, 16–20 and 20–25 will be varied in accordance with the changes in depth of entry into the interdental spaces and therefore the increasing height of the side wings and the increasing lengths of the entire chip channel as illustrated in FIGS. 15 to 18. Thus, the metal layers assigned to the last acting group of teeth become progressively thinner not only at the bottoms but also at the sides of the channel shaped layers, thus causing a fine finish to be imparted to the final surfaces of the interdental spaces in spite of the heavy loading of all of the cutter teeth in order to achieve optimum production.

The effect of stepping the cutting edges 50 in the manner just described may best be appreciated by reference to FIGS. 4, 19 and 20. Each interdental space advances along an arcuate path 75 and passes through the plane of rotation of the cutting edges 50 while traversing the length of the cutter, that is, through an angle 84 (FIGS. 4 and 20). For example, a space 30ª reaches the plane 76 of the tooth 1 when this tooth reaches the plane of the work and enters the latter, the maximum depth of penetration of the work and the depth of the chip 66 removed by this tooth being indicated at 77. Since the arc of engagement of this tooth with the work is short, this tooth is, in accordance with the stepping pattern above described, assigned a substantial thickness by stepping its cutting edge 50 outwardly beyond that of the tooth 25 which, in the previous revolution of the work was the last to act on the space 30ª.

After the space 30ª has been milled by the teeth 2 to 6 and reaches the second position shown in FIG. 19, it will be disposed in the plane of rotation of and be engaged by the tooth 7. The latter enters to an increased depth into the space so that the metal layer removed will have become channel shaped with side wings 78 which are of somewhat different thickness owing to slightly tilted position of the center line of the space 30ª. Thus, in order for the tooth to remove the same desired volume of metal as each of the preceding teeth, it is assigned a bottom thickness 79 which compensates for the increased length of this layer and the thickness of its side wings.

In the same way, the proper thicknesses assigned to the subsequently acting teeth, for example 13 and 19, will, when the space 30ª comes into operative association with these teeth, remove layers of lesser thickness at the bottoms 80 and 81 but have the desired uniform volume. Both the bottom and sides of the layer removed by the tooth 19 are correspondingly thinner at the assigned thickness of this layer as indicated at 85 (FIG. 20).

When the space 30ª reaches the fifth position shown in FIG. 19, its center line will coincide with the center line of the last tooth 25 in the helical row. Thus, this tooth in passing through the work while thus mating precisely with the space 30ª will remove a final layer 86 all across the bottom and sides of the space thus finishing the space to the desired final contour.

One way of determining the amount of step down or step out for each individual tooth is illustrated in FIGS. 21 and 22. This involved laying out the motions of the work and cutting edges for a given tooth and measuring the amount of step down required relative to the adjacent preceding tooth in order to achieve the assigned chip thickness. A radial height 87 (FIG. 21) of the last acting or finishing tooth 25 established as above described is used as a reference in determining the proper height of all of the other teeth in order that each tooth will take the assigned depth of cut. The height of the first tooth 1 in the helical row is first ascertained since it is the next tooth to engage in the interdental space last engaged by tooth 25 in moving along a path 88 and breaking out of the work at 63 when the cutter has been fed to locate the axis at 89. The space thus finished by tooth 25 is presented to tooth 1 after one revolution of the work less the angle 84 (FIG. 4), at which time the surface 88 of this space, previously finished by the tooth 25, will be disposed at 88ª. During this rotation of the work, the cutter axis is advanced to 90 through a distance 91.

If the tooth 1 were of the same height as the tooth 25, as determined by using its radius 87 as a reference, the tooth 1 would either not engage the work or would engage at 92, cut therethrough along a path 93 and break out at 94. In the latter case, the metal layer removed would be of lesser thickness than that assigned to the tooth 1 as indicated at 95. To achieve such thickness then, the tooth 1 should cut through the work along a path 96 and break out at 97 thus necessitating increasing the height of the tooth by an amount 98. Accordingly, during machining of the cutter edge 50 of the tooth 1 in the manner above described, the back-off tool 52 is set so as to form the tooth profile at a tip radius 99.

Next, the radial height of the tooth 1 is used in a similar way and as a reference to determine the proper radial height of the tooth 2 for removing a metal layer 100 (FIG. 22) of the assigned thickness. The radius of tooth 1 would traverse a path 101 and break out of the work at 102 as indicated by the reference radius 99 from the cutter axis 103 at the time of the break out. Thus the metal layer that is removed by the tooth 2 when of this radius would be thicker than the thickness 100 assigned to the tooth 2 in the illustrated embodiment. To achieve the desired thickness, the tooth 2 should break out of the work at 104 after traversing a path 105 of shorter radius 106 than the reference radius 99 by an amount 107. Accordingly, the tooth 2 is shaped in the back-off operation to have such a radius 106.

This same procedure may be used in determining the proper height of the remaining teeth 3 to 24 for effecting the removal of metal layers 73 of the respective thickness assigned to these teeth.

Figures 10, 10A:
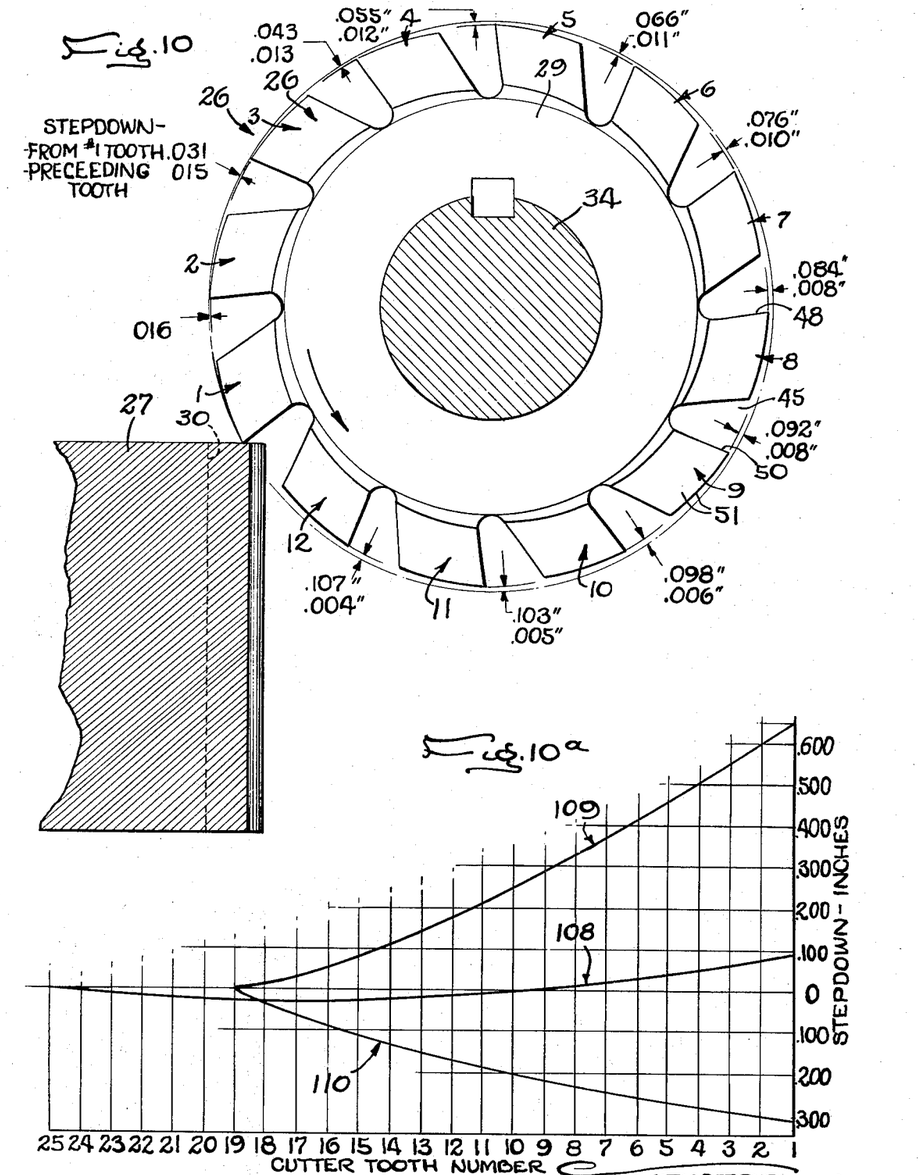
FIG. 10 is a fragmentary section taken along the line 10—10 of FIG. 4.
FIG. 10a shows curves of typical stepping patterns for cutters embodying the present invention and adapted for milling different gears.

By following a procedure such as described above, it will be found that to produce the gear 28 selected for illustration with the cutter 26 while approximately equalizing the volumes of metal removed by the respective teeth 1–25, these teeth should vary in radial height in accordance with the precise pattern 108 shown in FIG. 10a. That is to say, the heights of the teeth 1 to 9 are slightly greater than the height of the reference finishing tooth 25, and tooth 10 is of the same height. The decrease in height continues to the tooth 18 after which the teeth 19 to 24 are stepped out progressively to the radius of the finishing tooth 25.

In producing other gears in accordance with the present invention, the stepping pattern will vary with the dimensional characteristics of the gear and the cutter to be used including the pitch diameter of work, the number of gear and cutter teeth, the feed rate of the cutter, and its setting angle 68. Thus, for a helical gear having 200 teeth with a helix angle of 13 degrees and using a cutter having 19 teeth in each helical row, the cutter teeth should be stepped in accordance with the pattern 109 (FIG. 10a), the step-down being progressive over the entire row of successively acting teeth.

The required stepping pattern may be reversed for certain gears such as a 300 tooth helical gear having a helix angle of six degrees using a 19 tooth per thread cutter. For such a gear, the successively acting cutter teeth should be stepped out progressively following a pattern such as 110 shown in FIG. 10a.

Also contributing to the uniform loading of the cutter in service use is the selection of the proper angle 70, 17 degrees in this instance, of the gashes 45 and therefore the timing of the disengagement of the trailing tooth of each longitudinal row relative to the next engagement of the leading tooth in that row. The gash angle, in the case of each longitudinal row of teeth, is such that there is some slight overlap in the successive disengagement of the leading tooth and engagement of the trailing tooth of the row. Such overlapping engagement of the teeth of successive longitudinal rows contributes importantly to the uniform loading of the cutter during service use. The determination of the proper gash angle to satisfy the foregoing involves consideration of the relative radial heights, established as above described, of the first and last acting teeth of each row along the gashes 45.

When a cutter constructed as above described is mounted in a conventional hobbing machine and adapted for the all approach action with the cutter and work rotation and transverse cutter feed properly synchronized, it is possible to mill gears, especially those of large diameters, at a production rate far exceeding other available gear cutting processes. The improved result is due to the large number of cutting teeth that may be used on the cutter, the pattern of stepping of the tooth heights to equalize and achieve optimum volumes of metal removal by the therefore equalized loading of the different teeth, and to the continuous and uniform overall loading of the cutter by virtue of the proper angle of the gashes.

I claim as my invention:

1. A cutter adapted for use in a conventional hobbing cycle to continuously mill interdental spaces of predetermined and desired cross-sectional profile in the periphery of a cylindrical metal work blank, said cutter having, in combination, a generally cylindrical body adapted for rotation about its longitudinal axis, a multiplicity of teeth projecting from the periphery of the body and angularly spaced along a helical line extending around the body at least a full revolution, said line being inclined relative to said axis at a constant lead angle determined by the pitch of said interdental spaces, cutting edges around the projecting ends of the leading faces of said teeth having profiles corresponding to the desired final cross-sectional profiles of said spaces by virtue of the formation of all of said edge profiles by the same form tool moved only rectilinearly relative to the cutter, the projection of at least the last of said profiles on a plane paralleling said cutter axis being of a determined shape to produce said desired interdental space profile, and the radial spacing of the successively acting cutting edges along said helical line varying, according to a preselected pattern, with the arcuate lengths of the metal layers removed by the respective cutting edges along said spaces whereby the thicknesses of the layers removed by the successively acting teeth decrease progressively to compensate for the lengthening of the layers and cause the volumes of metal removed by the successively acting teeth to be substantially equalized.

2. A cutter as defined in claim 1 in which the cutting edges of the first and last teeth of said helical row are spaced longitudinally and angularly of said body so that in successive revolutions of the cutter during the synchronized turning of the cutter and work and cross feeding of the cutter, said first tooth engages the work before the last tooth passes out of engagement with the work.

3. For milling helical gears having a predetermined helix angle, a milling cutter as defined in claim 1 in which the difference between said gear helix angle and said lead angle of the cutter thread is within a range of 0 to 8 degrees.

4. For milling helical gears having a predetermined helix angle, a milling cutter as defined in claim 1 in which the difference between said gear helix angle and said lead angle of the cutter thread is substantially zero.

5. A milling cutter as defined in claim 3 in which the said gear and cutter helix angles are of the same hand.

6. For milling gears having a predetermined number of teeth, a milling cutter as defined in claim 1 in which the total number of said cutter teeth is equal to said predetermined number of said gear teeth divided by about six.

7. A cutter adapted for use in a conventional hobbing cycle to continuously mill interdental spaces of predetermined and desired cross-sectional profile in the periphery of a cylindrical metal work blank, said cutter having, in combination, a generally cylindrical body adapted for rotation about its longitudinal axis, a multiplicity of teeth projecting from the periphery of the body and angularly spaced along a helical line extending around the body at least a full revolution, said line being inclined relative to said axis at a constant lead angle determined by the pitch of said interdental spaces, cutting edges around the projecting ends of the leading faces of said teeth having profiles corresponding to the desired final cross-sectional profiles of said spaces, the cutting edges of the successively acting teeth in said helical row having progressively increasing arcs of engagement with the work along said interdental spaces and being positioned at different radial distances along the row in accordance with a preselected pattern whereby to provide for the removal of approximately equalized volumes of metal by the successively acting teeth and therefore for uniform loading of the cutter.

8. A milling cutter as defined in claim 7 in which said helical row of teeth extends around said body at least two full revolutions and the body is formed with longitudinally extending gashes inclined relative to the said axis with the cutting faces of at least two teeth of said helical rows defined by the trailing wall of one of said gashes, the inclination of said gashes being correlated with the varying radial heights of spaces therealong so that the engagement of the work by the leading tooth along each gash overlaps the disengagement of the trailing tooth along the same gash.

No references cited.

HARRISON L. HINSON, *Primary Examiner.*